(12) United States Patent  (10) Patent No.: US 8,875,060 B2
Barak et al.  (45) Date of Patent: Oct. 28, 2014

(54) CONTEXTUAL GESTURES MANAGER

(75) Inventors: Nimrod Barak, Nes Tziona (IL); Doron Lehmann, Kfar Vradim (IL); Eyal Nathan, Tel-Aviv (IL)

(73) Assignee: SAP AG, Walldorf (DE)

( * ) Notice: Subject to any disclaimer, the term of this patent is extended or adjusted under 35 U.S.C. 154(b) by 129 days.

(21) Appl. No.: 13/487,646

(22) Filed: Jun. 4, 2012

(65) Prior Publication Data
US 2013/0326429 A1 Dec. 5, 2013

(51) Int. Cl.
G06F 3/033 (2013.01)
G06F 3/00 (2006.01)
G06F 3/048 (2013.01)

(52) U.S. Cl.
USPC ............................ 715/863; 715/716; 715/764

(58) Field of Classification Search
USPC ......................................... 715/863, 716, 764
See application file for complete search history.

(56) References Cited

U.S. PATENT DOCUMENTS

| | | | |
|---|---|---|---|
| 7,479,949 B2* | 1/2009 | Jobs et al. | 345/173 |
| 8,341,558 B2* | 12/2012 | Li | 715/863 |
| 8,542,207 B1* | 9/2013 | Truta et al. | 345/173 |
| 8,589,808 B1* | 11/2013 | Alfaro et al. | 715/753 |
| 8,767,019 B2* | 7/2014 | Heinrich et al. | 345/661 |
| 2009/0027354 A1* | 1/2009 | Perski et al. | 345/173 |
| 2010/0020222 A1* | 1/2010 | Jones et al. | 348/333.02 |
| 2010/0299635 A1* | 11/2010 | Oh et al. | 715/811 |
| 2010/0321319 A1* | 12/2010 | Hefti | 345/173 |
| 2011/0041102 A1* | 2/2011 | Kim | 715/863 |
| 2011/0043472 A1* | 2/2011 | Hada | 345/173 |
| 2011/0181526 A1* | 7/2011 | Shaffer et al. | 345/173 |
| 2012/0120277 A1* | 5/2012 | Tsai | 348/223.1 |
| 2012/0159402 A1* | 6/2012 | Nurmi et al. | 715/863 |
| 2012/0223895 A1* | 9/2012 | Lu et al. | 345/173 |
| 2012/0293456 A1* | 11/2012 | Ikeda et al. | 345/174 |
| 2012/0304132 A1* | 11/2012 | Sareen et al. | 715/863 |
| 2012/0324403 A1* | 12/2012 | Van De Ven et al. | 715/863 |
| 2013/0326430 A1* | 12/2013 | Devi et al. | 715/863 |
| 2014/0053114 A1* | 2/2014 | Kwon | 715/863 |
| 2014/0101612 A1* | 4/2014 | Jain et al. | 715/815 |
| 2014/0109012 A1* | 4/2014 | Choudhary et al. | 715/838 |
| 2014/0113268 A1* | 4/2014 | Dhasmana et al. | 434/365 |
| 2014/0152693 A1* | 6/2014 | Radakovitz et al. | 345/629 |
| 2014/0164966 A1* | 6/2014 | Kim et al. | 715/769 |

* cited by examiner

*Primary Examiner* — David Phantana Angkool
(74) *Attorney, Agent, or Firm* — Buckley, Maschoff & Talwalkar LLC

(57) ABSTRACT

According to some embodiments, a method and apparatus are provided to receive a first gesture registration associated a first application, receive a portal gesture registration associated with a web portal, and prioritize gestures associated with the web portal based on the first gesture registration and the portal gesture registration.

11 Claims, 7 Drawing Sheets

100

Receive a first gesture registration associated a first application
101

Receive a portal gesture registration associated with a web portal
102

Prioritize gestures associated with the web portal based on the first gesture registration and the portal registration.
103

600

| Webpage 602 | Frame 604 | Gesture 606 | Priority 608 |
|---|---|---|---|
| 200 | 201 | Swipe | 5 |
| 300 | 301 | Pinch-to-zoom | 7 |
| 300 | 302 | Tap | 9 |
| 300 | 300 | Tap | 2 |

FIG. 6

CONTEXTUAL GESTURES MANAGER

BACKGROUND

A web portal is a web site that combines information from a variety of different sources in a single web page. Typically, each information source is associated with a dedicated area on a web portal for displaying information and each dedicated area may be associated with a web browser frame. Each frame may recognize a different gesture. Gesture recognition interprets human gestures to allow a user to interact with a mobile device (e.g., tablet or cellular phone). For example, a user may point a finger at a screen of the mobile device so that a cursor will move accordingly, the user may point a finger to scroll a screen of the mobile device, and/or the user may use a pinch-to-zoom gesture to enlarge the content displayed on the screen.

Many users view web pages via their mobile device. However, viewing and interacting with a web page portal that includes a variety of web browser frames that implement different gestures can be difficult to navigate on a mobile device due to the small screen sizes that are typically associated with mobile devices.

BRIEF DESCRIPTION OF THE DRAWINGS

FIG. 6 illustrates a portion of a database that might be stored in accordance with some embodiments.

DETAILED DESCRIPTION

Figure 1:
FIG. 1 illustrates a method according to some embodiments.
Figure 1:

Referring now to FIG. 1, an embodiment of a method 100 is illustrated. The method 100 may be embodied on a non-transitory computer-readable medium. Furthermore, the method 100 may be performed by an apparatus such as, but not limited to, the apparatus of FIG. 4 or FIG. 5. The method 100 may relate to managing priorities of gestures being used on a web portal that is viewed on a mobile device. Each dedicated area of the web portal may be associated with an application. In some embodiments each dedicated area may be associated with a different application however, in other embodiments, multiple areas of the web portal may be associated with a same application.

At 101, a first gesture registration associated a first application is received. The registration may be received at gesture manager which stores each registration in a database. The first gesture registration may comprise an identification of an application or a frame of a web portal, an indication of a type of gesture associated with the application, frame or portal, and a gesture priority level.

Figure 2:
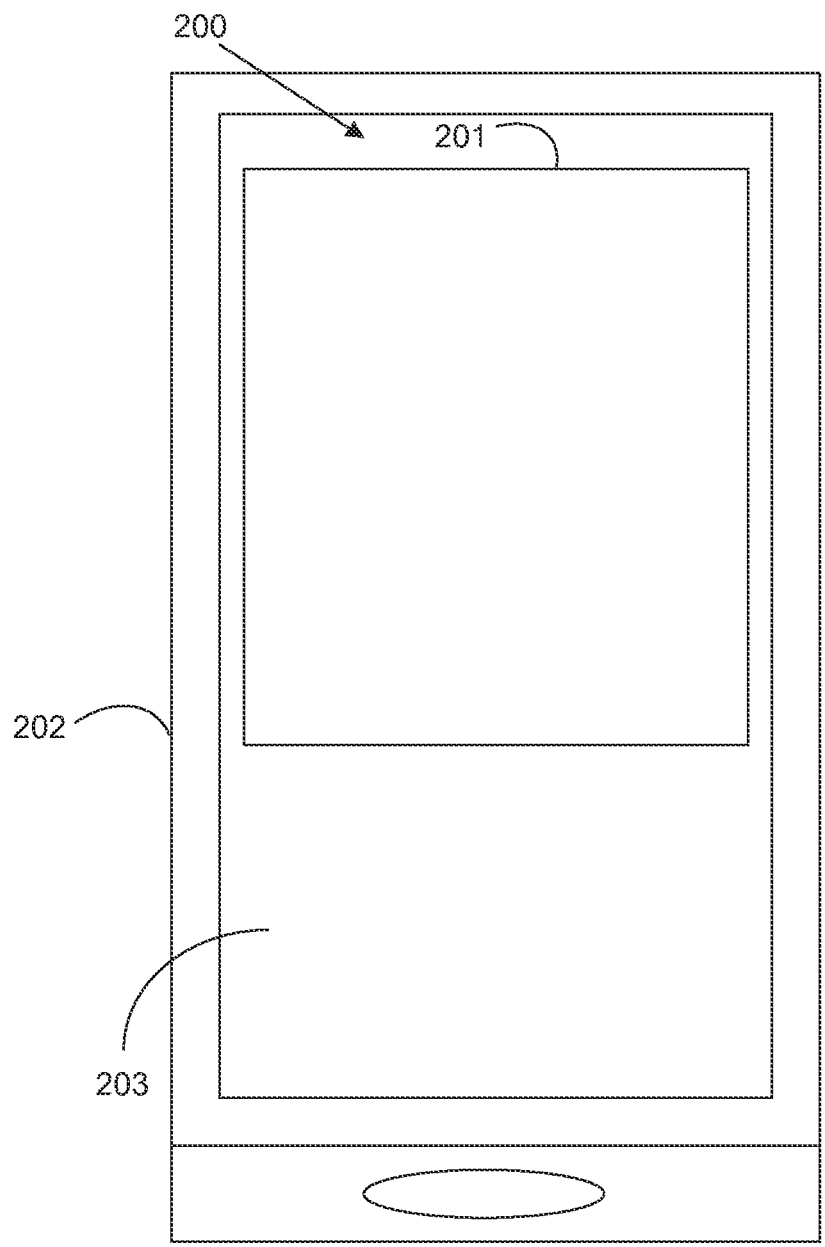
FIG. 2 illustrates a web portal viewed a mobile device according to some embodiments.

For illustrative purposes, and to aid in understanding features of the specification, some examples will now be introduced. These examples are not intended to limit the scope of the claims. In a first example, and now referring to FIG. 2, a mobile device 202 comprises a web portal 200 that comprises a text portion 203 and a first frame 201. The first frame 201 is associated with a gesture registration received at the registration manager. The gesture registration may comprise an identification of the first frame (e.g., the first frame 201), an indication of the type of gesture (e.g., a swipe gesture), and a gesture priority level (e.g., a level of 3).

In a second example, the gesture registration may comprise an identification of the first frame (e.g., 201), an indication of the type of gesture (e.g., a swipe gesture), and a gesture priority level (e.g., a level of 8).

Referring back to FIG. 1, at 102 a portal gesture registration associated with a web portal is received. The web portal may be associated with a gesture registration for the entire web portal, or in other words, a master gesture registration for a particular gesture. The registration may be received at the gesture manager. The web portal registration may comprise an identification of a web portal, an indication of a type of gesture associated with the web portal, and a gesture priority level.

Continuing with the above examples and again referring to FIG. 2, a web portal gesture registration associated with web portal 200 may be received. The gesture registration may comprise an identification of the web portal (e.g., 200), an indication of the type of gesture (e.g., a swipe gesture), and a web portal gesture priority level (e.g., a level of 5).

Next, at 103, gestures associated with the web portal are prioritized based on the first gesture registration and the portal gesture registration.

Continuing with the first example, since the web portal gesture registration comprises a level 5 swipe gesture priority, and the gesture registration for the first frame 201 comprises a level 3 swipe gesture priority, then in this example priority goes to the web portal because it has a higher priority. Since the web portal has a higher swipe gesture priority, when a user swipes across anywhere on the web portal, including the first frame 201, the web portal as a whole will move in relation to the swipe (e.g., the text area 203 and the first frame will move in accordance with the swipe).

Continuing with the second example, since the web portal gesture registration comprises a level 5 swipe gesture priority, and the gesture registration for the first frame 201 comprises a level 8 swipe gesture priority, then in this second example priority goes to the first frame 201 because it has a higher priority. Since the first frame 201 has a higher priority swipe gesture, when a user swipes in the first frame 201, the content within the first frame 201 will move in response to the swipe gesture while the web portal does not move in response to the swipe gesture.

The concept of prioritizing gestures also works in conjunction with other gestures besides a swipe gesture such as a pinch-to-zoom gesture. Say, for example, that a web portal gesture registration for a pinch-to-zoom gesture has a priority level of 5, and the pinch-to-zoom gesture registration for the first frame 201 has a priority level of 3, then for this example when a user performs a pinch-to-zoom, the web portal as a whole will be enlarged. However, if web portal gesture registration for a pinch-to-zoom gesture has a priority level of 5, and the pinch-to-zoom gesture registration for the first frame 201 has a priority level of 8, then for this example when a user performs a pinch-to-zoom, the web portal as a whole will be not be enlarged but the first frame 201 will respond to the pinch-to-zoom (e.g., be enlarged). While higher priority levels are deemed as superior in the present examples, in some embodiments lower priority levels may be deemed superior.

Figure 3:
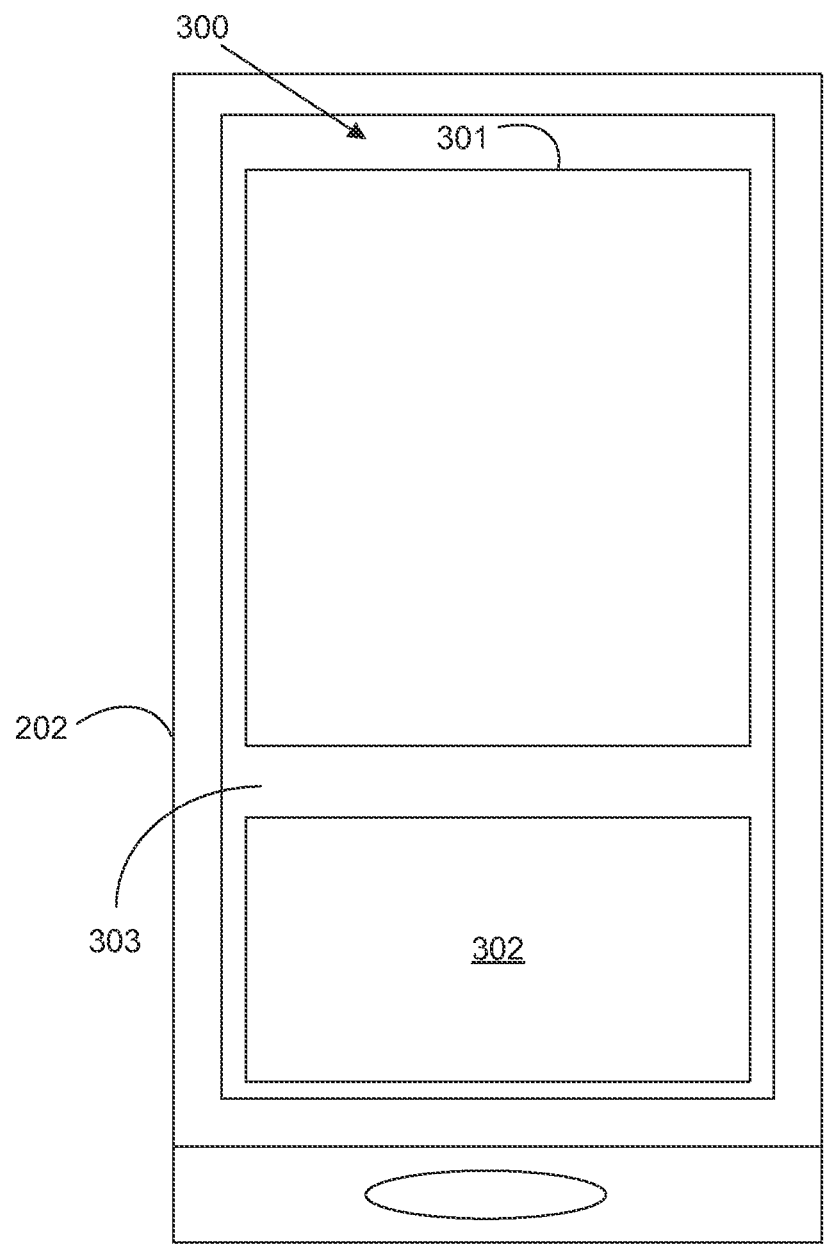
FIG. 3 illustrates a web portal viewed a mobile device according to some embodiments.

Now referring to FIG. 3, the mobile device 202 comprises a web portal 300 comprising a text portion 303, a first frame 301, and a second frame 302. The first frame 301 may be associated with a first gesture registration sent to a registration engine. The second frame 302 may be associated with a second gesture registration sent to the registration engine.

In a third example, the first gesture registration may comprise an identification of the first frame (e.g., 301), an indication of the type of gesture (e.g., a swipe gesture), and a gesture priority level (e.g., a level of 3). The second gesture registration may comprise an identification of the second frame (e.g., 302), an indication of the type of gesture (e.g., a swipe gesture), and a gesture priority level (e.g., a level of 4). The web portal gesture priority level for a swipe gesture in this example is 5. In this case the web portal gesture is given priority over the first and second frames 301/302. The text area 303 will therefore move in response to the swipe gesture.

In another example, the first gesture registration has a priority of 9, the second gesture registration has a priority of 8 and the web portal registration has a priority of 7. In this embodiment, priority is given to the first frame 301. However, if a swipe is made outside the first frame 301 such as in the second frame 302, then another determination may be made as to whether the second frame 302 has a higher gesture priority than the web portal gesture priority. If the second frame 302 has a higher gesture priority than the web portal gesture priority, then the content within the second frame 302 will respond to the swipe gesture. If not, the web portal will move as a whole in response to the swipe gesture. In another embodiment, the first gesture priority may become a master priority for the web portal and a response to a particular gesture may only occur in the first frame since it has the highest priority.

In some embodiments, each frame 301/302 may be assigned a highest priority for a particular gesture, for example, the first frame 301 may have a highest priority for a tap gesture, the second frame 302 may have a highest priority for a pinch-to-zoom gesture and the web portal 300 may have a highest priority for a swipe gesture. Therefore, a web portal with these attributes and frames will respond to specific gestures based on their assigned priorities. According to some embodiments, prioritizing gestures may provide a less cumbersome experience while navigating a web portal using a mobile device. In a case where gestures priority levels are equal, the gesture manager may default to the web portal priority. In some embodiments, other characteristics that may determine when and how events will be passed to an application according to context and content may also be stored in the gesture manager.

Figure 4:
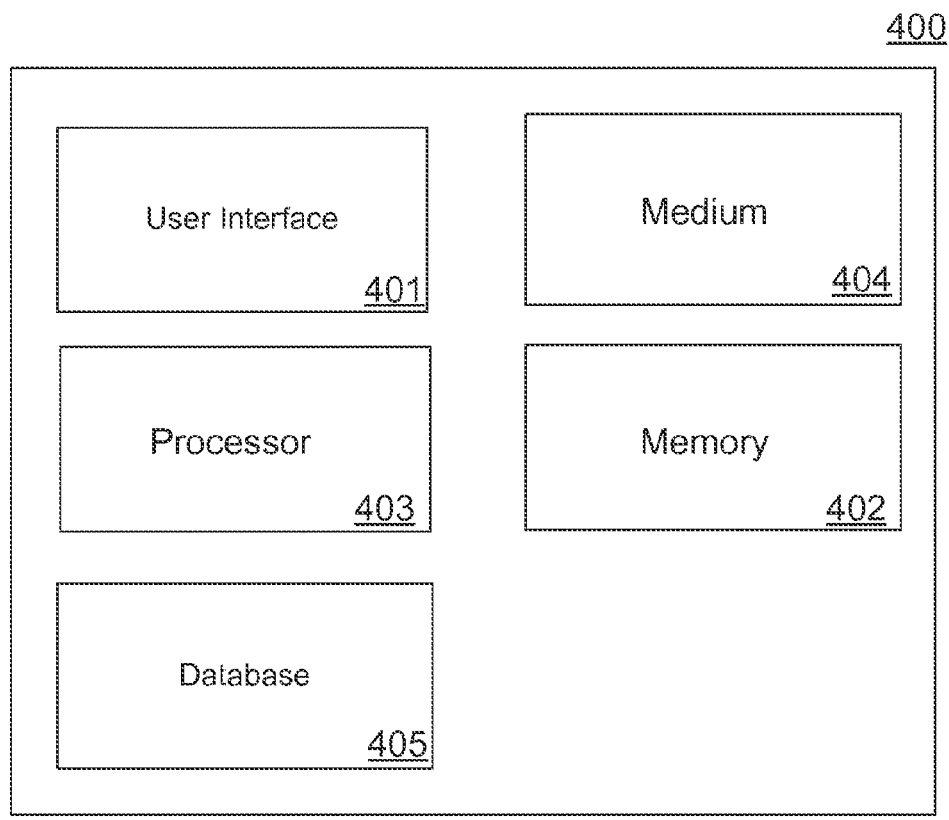
FIG. 4 illustrates a computing system according to some embodiments.

Now referring to FIG. 4, an embodiment of an apparatus 400 is illustrated. The apparatus 400 may comprise a user interface 401, a main memory 402, a processor 403, a medium 404, and a database 405. According to some embodiments, the apparatus 400 may further comprise a digital display port, such as a port adapted to be coupled to a digital computer monitor, television, portable display screen, or the like.

The user interface 401 may allow users to interact with the apparatus 400 using text commands or with images/graphical icons. In some embodiments, the user interface may comprise a keyboard, mouse, or associated port related thereto. Furthermore, the user interface 401 may comprise a display or a touch screen.

The main memory 402 may comprise any type of memory for storing data, such as, but not limited to, a Secure Digital (SD) card, a micro SD card, a Single Data Rate Random Access Memory (SDR-RAM), a Double Data Rate Random Access Memory (DDR-RAM), or a Programmable Read Only Memory (PROM). The main memory 402 may comprise a plurality of memory modules.

The processor 403 may include or otherwise be associated with dedicated registers, stacks, queues, etc. that are used to execute program code and/or one or more of these elements may be shared there between. In some embodiments, the processor 403 may comprise an integrated circuit. In some embodiments, the processor 403 may comprise circuitry to perform a method such as, but not limited to, the method described with respect to FIG. 1.

The medium 404 may comprise any computer-readable medium that may store processor-executable instructions to be executed by the processor 403. For example, the medium 404 may comprise a non-transitory tangible medium such as, but is not limited to, a compact disk, a digital video disk, flash memory, optical storage, random access memory, read only memory, or magnetic media.

The database 405 may be stored on a storage device and may comprise data, including information associated with gesture priorities. An example of a database that may be used in connection with the apparatus 400 will be described in detail with respect to FIG. 6. Note that the database described herein is only an example, and additional and/or different information may be stored therein. Moreover, various databases might be split or combined in accordance with any of the embodiments described herein.

Figure 5:
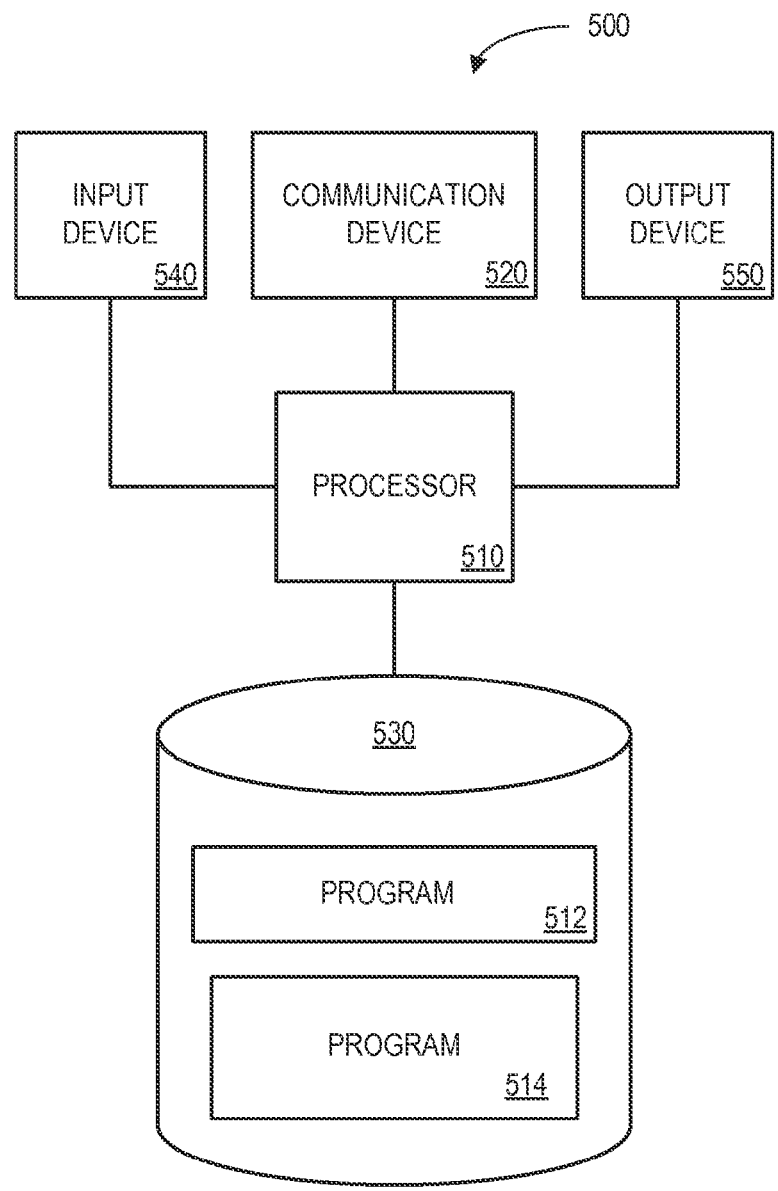
FIG. 5 is a block diagram of an apparatus according to some embodiments.

Now referring to FIG. 5, FIG. 5 is a block diagram overview of an apparatus 500 according to some embodiments. The apparatus 500 may be, for example, associated with a mobile device, such as a phone or tablet. The apparatus 500 comprises a processor 510, such as one or more commercially available Central Processing Units (CPUs) in the form of one-chip microprocessors, coupled to a communication device 520 configured to communicate via a communication network (not shown in FIG. 5). The communication device 520 may be used, for example, as an input path to receive information about user roles. The apparatus 500 further includes an input device 540 (e.g., a touchscreen for navigation of a web portal) and an output device 550 (e.g., a touchscreen to display the web portal).

The processor 510 communicates with a storage device 530. The storage device 530 may comprise any appropriate information storage device, including combinations of magnetic storage devices (e.g., a hard disk drive), optical storage devices, and/or semiconductor memory devices. The storage device 530 stores a program 512 and/or navigation platform 514 for controlling the processor 510. The processor 510 performs instructions of the programs 512, 514, and thereby operates in accordance with any of the embodiments described herein. For example, the processor 510 may implement received gesture priorities associated with a web portal being viewed on the apparatus 500.

The programs 512, 514 may be stored in a compressed, uncompiled and/or encrypted format. The programs 512, 514 may furthermore include other program elements, such as an operating system, a database management system, and/or device drivers used by the processor 510 to interface with peripheral devices.

As used herein, information may be "received" by or "transmitted" to, for example: (i) the apparatus 500 from another device; or (ii) a software application or module within the apparatus 500 from another software application, module, or any other source.

Referring to FIG. 6, a table is shown that represents a database 600 that may be stored locally at a web server, such as apparatus 400. The table may include, for example, entries identifying information about gestures associated with a plurality of priorities. The table may also define fields 602, 604, 606, and 608 for each of the entries. The fields 602, 604, 606, and 608, may, according to some embodiments, specify: a web portal 602, a frame 604, a gesture type 606 and a priority 608. The information in the database 600 may be created and updated, for example, based on data received from a gesture manager editor.

Figure 7:
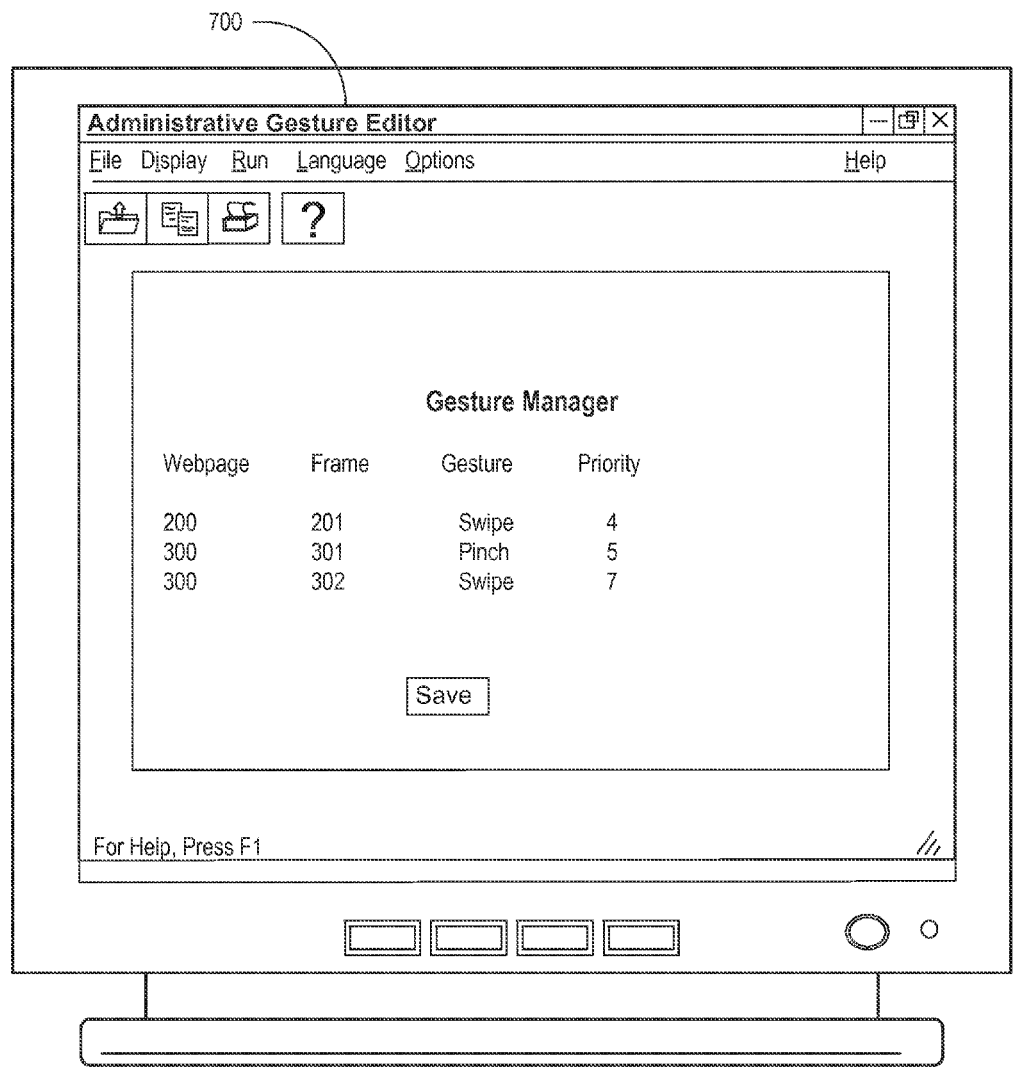
FIG. 7 illustrates a gesture manager editor according to some embodiments.

FIG. 7 illustrates a gesture Manager editor 700 according to some embodiments. The editor 700 may, for example, let an administrator enter and/or adjust priorities associated with a plurality of gestures and their associated web portal and/or web portal frames. For each gesture, a priority may be entered and each frame and/or web portal that utilized the particular gesture. The editor may enable a layer of gesture priorities on top of an application so that a design of the application may be used for different platforms or for different runtime scenarios.

The gesture manager may receive the registrations from the gesture manager editor, parse the registrations and store the gesture registrations in a database. Furthermore, the registration manager may receive a request from an application for priorities associated with a web portal. In such a case, the registration manager may query the database for priorities associated with the web portal and return a list of gestures and their respective priorities to the requesting application. The gesture manger may be embodied on a web server such as, but not limited to, apparatus 400.

The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Moreover, while embodiments have been illustrated using particular types of tables and databases, embodiments may be implemented in any other of a number of different ways. For example, some embodiments might be associated with publically available information, such as flight or train schedules available via web sites.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A method comprising:
    receiving a first gesture registration associated with a first application that is associated with a first web browser frame of a web portal, the first gesture registration comprising a gesture priority level;
    receiving a portal gesture registration associated with the web portal, the portal gesture registration comprising a web portal gesture priority level;
    prioritizing, via a processor, the first gesture registration and the portal gesture registration; and
    receiving a second gesture registration associated with a second application that is associated with a second web browser frame of the portal, the second gesture registration comprising a second gesture priority level, wherein the prioritizing is based on the gesture priority level, the web portal gesture priority level and the second gesture priority level.

2. The method of claim 1, wherein in a case that the web portal gesture priority level is less than the gesture priority level, the first application responds to a received gesture.

3. The method of claim 1, wherein in a case that the web portal gesture priority level is greater than the gesture priority level, the web portal as a whole responds to a received gesture.

4. The method of claim 1, wherein the first gesture registration further comprises an identification of a first frame of a web page and an indication of a type of gesture.

5. The method of claim 4, further comprising:
    receiving a second gesture registration associated with a second application, the second gesture registration comprising a second gesture priority level, an identification of a second frame, and an indication of the type of gesture, wherein a gesture made outside the first frame initiates a determination as to whether the second frame has a higher gesture priority level than the web portal gesture priority level.

6. A non-transitory computer-readable medium comprising instructions that when executed by a processor perform a method, the method comprising:
    receiving a first gesture registration associated with a first application that is associated with a first web browser frame of a web portal, the first gesture registration comprising a gesture priority level;
    receiving a portal gesture registration associated with the web portal, the portal gesture registration comprising a web portal gesture priority level;
    prioritizing, via a processor, the first gesture registration and the portal gesture registration; and
    receiving a second gesture registration associated with a second application that is associated with a second web browser frame of the portal, the second gesture registration comprising a second gesture priority level, wherein the prioritizing is based on the gesture priority level, the web portal gesture priority level and the second gesture priority level.

7. The medium of claim 6, wherein in a case that the web portal gesture priority level is less than the gesture priority level, the first application responds to a received gesture.

8. The medium of claim 6, wherein in a case that the web portal gesture priority level is greater than the gesture priority level, the web portal as a whole responds to a received gesture.

9. An apparatus comprising:
    a processor;
    a non-transitory computer-readable medium comprising instructions that when executed by the processor perform a method, the method comprising:
    receiving a first gesture registration associated with a first application that is associated with a first web browser frame of a web portal, the first gesture registration comprising a gesture priority level;
    receiving a portal gesture registration associated with the web portal, the portal gesture registration comprising a web portal gesture priority level;
    prioritizing, via the processor, the first gesture registration and the portal gesture registration; and
    receiving a second gesture registration associated with a second application that is associated with a second web browser frame of the portal, the second gesture registration comprising a second gesture priority level, wherein the prioritizing is based on the gesture priority level, the web portal gesture priority level and the second gesture priority level.

10. The apparatus of claim 9, wherein in a case that the web portal gesture priority level is less than the gesture priority level, the first application responds to a received gesture.

11. The apparatus of claim 9, wherein in a case that the web portal gesture priority level is greater than the gesture priority level, the web portal as a whole responds to a received gesture.

* * * * *